United States Patent
Hlatky et al.

(10) Patent No.: US 6,579,957 B2
(45) Date of Patent: Jun. 17, 2003

(54) SINGLE-SITE CATALYSTS BASED ON ANIONIC THIOPYRAN DIOXIDE LIGANDS

(75) Inventors: Gregory G. Hlatky, Morrow, OH (US); Sandor Nagy, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 176 days.

(21) Appl. No.: 09/829,868

(22) Filed: Apr. 11, 2001

(65) Prior Publication Data

US 2002/0156211 A1 Oct. 24, 2002

(51) Int. Cl.[7] .................. C08F 4/642; C08F 4/643; C07D 335/00
(52) U.S. Cl. ............ 526/161; 526/134; 526/172; 526/943; 526/170; 502/103; 502/117; 502/155; 549/3; 549/13; 556/52
(58) Field of Search ................ 502/103, 155, 502/117; 526/134, 161, 172, 943; 549/3, 13; 556/52

(56) References Cited

U.S. PATENT DOCUMENTS

| | | | |
|---|---|---|---|
| 4,752,597 A | 6/1988 | Turner ............... | 502/104 |
| 4,791,180 A | 12/1988 | Turner ............... | 526/160 |
| 5,153,157 A | 10/1992 | Hlatky et al. ........ | 502/117 |
| 5,198,401 A | 3/1993 | Turner et al. ........ | 502/155 |
| 5,241,025 A | 8/1993 | Hlatky et al. ........ | 526/129 |
| 5,304,615 A | 4/1994 | Ambler et al. ....... | 526/189 |
| 5,539,124 A | 7/1996 | Etherton et al. ..... | 548/402 |
| 5,554,775 A | 9/1996 | Krishnamurti et al. .. | 556/7 |
| 5,637,659 A * | 6/1997 | Krishnamurti et al. .. | 526/133 |
| 5,637,660 A | 6/1997 | Nagy et al. ......... | 526/160 |
| 5,731,101 A | 3/1998 | Sherif et al. ........ | 429/102 |
| 5,827,602 A | 10/1998 | Koch et al. ......... | 429/194 |
| 5,892,124 A | 4/1999 | Olivier et al. ....... | 568/374 |
| 5,902,866 A | 5/1999 | Nagy et al. ......... | 526/133 |
| 6,232,260 B1 | 5/2001 | Nagy et al. ......... | 502/155 |

FOREIGN PATENT DOCUMENTS

WO    WO 99/24446    5/1999

OTHER PUBLICATIONS

Kuthan et al., Adv. Heterocyc. Chem. 59 (1994) 179–244.*
Y. Gaoni, *J. Org. Chem.* 46 (1981) 4502.
E. Molenaar et al., *Rec. Trav. Chim. Pays–Bas* 86 (1967) 1047.
E. Boelema et al., *Rec. Trav. Chim. Pays–Bas* 86 (1967) 1275.
J. Kuthan et al., *Adv. Heterocycl. Chem.* 59 (1994) 179.
J. Kuthan, *Adv. Heterocycl. Chem.* 34 (1983) 145.

* cited by examiner

*Primary Examiner*—David W. Wu
*Assistant Examiner*—R. Rabago
(74) *Attorney, Agent, or Firm*—Jonathan L. Schuchardt

(57) ABSTRACT

Single-site catalysts useful for polymerizing olefins are disclosed. The catalysts incorporate a Group 3 to 10 transition, lanthanide, or actinide metal and an anionic thiopyran dioxide ligand. Because a wide variety of thiopyran dioxides are easy to prepare from commercially available starting materials, the invention enables the preparation of a new family of single-site catalysts.

14 Claims, No Drawings

SINGLE-SITE CATALYSTS BASED ON ANIONIC THIOPYRAN DIOXIDE LIGANDS

FIELD OF THE INVENTION

The invention relates to catalysts useful for polymerizing olefins. In particular, the invention relates to catalysts that contain at least one anionic ligand derived from a thiopyran dioxide.

BACKGROUND OF THE INVENTION

Interest in single-site (metallocene and non-metallocene) catalysts continues to grow rapidly in the polyolefin industry. These catalysts are more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes commonly include one or more cyclopentadienyl groups, but many other ligands have been used. Putting substituents on the cyclopentadienyl ring, for example, changes the geometry and electronic character of the active site. Thus, a catalyst structure can be fine-tuned to give polymers with desirable properties. Other known single-site catalysts replace cyclopentadienyl groups with one or more heteroatomic ring ligands such as boraaryl (see, e.g., U.S. Pat. No. 5,554,775), pyrrolyl, indolyl, (U.S. Pat. No. 5,539,124), or azaborolinyl groups (U.S. Pat. No. 5,902,866).

Isolobal equivalents to the cyclopentadienide anion (i.e., other types of cyclic, anionic, 6π-electron donor ligands) provide an opportunity to expand the capabilities of single-site catalysts. There is a continuing need for catalysts with higher activities and/or the ability to produce polyolefins with better physical properties or improved processability. Of particular interest are catalysts that can be made from readily available starting materials.

SUMMARY OF THE INVENTION

The invention is catalyst system useful for polymerizing olefins. The catalyst system comprises an organometallic complex and an optional activator. The complex includes a Group 3 to 10 transition, lanthanide, or actinide metal and at least one anionic thiopyran dioxide ligand. Because a wide variety of thiopyran dioxides are easy to prepare from commercially available starting materials, the invention enables the preparation of a new family of single-site catalysts.

DETAILED DESCRIPTION OF THE INVENTION

Catalyst systems of the invention comprise an organometallic complex and an optional activator. The complex is "single site" in nature, i.e., it is a distinct chemical species rather than a mixture of different species. Single-site catalysts, which include metallocenes, typically give polyolefins with characteristically narrow molecular weight distributions (Mw/Mn<3) and good, uniform comonomer incorporation.

The organometallic complex includes a Group 3 to 10 transition, lanthanide, or actinide metal, M. More preferred complexes include a Group 4 to 10 transition metal. Group 4 complexes are particularly preferred.

The complex includes at least one anionic thiopyran dioxide ligand. These ligands are prepared by deprotonating a thiopyran dioxide using a potent base.

The simplest thiopyran dioxide is 2H-thiopyran-1,1-dioxide, which has the structure:

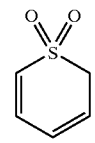

Deprotonation removes a methylene proton and generates an anionic species that is an isolobal equivalent of the cyclopentadienide anion:

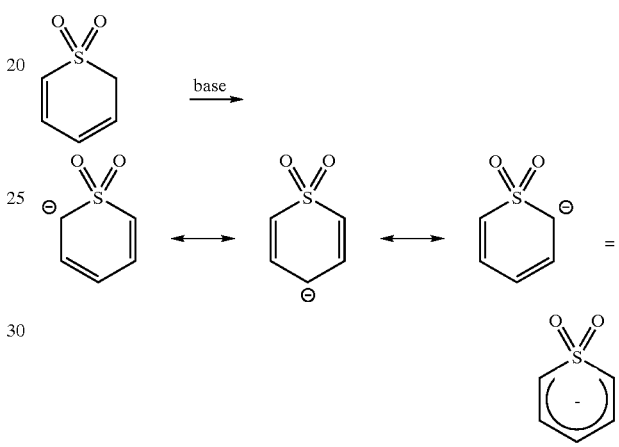

The anion is incorporated into an organometallic complex as described later below.

Suitable thiopyran dioxides can include subsituent groups such as alkyl, aryl, alkoxy, aryloxy, halide, dialkylamino, nitro, or the like, provided that one methylene proton (on the sp$^3$-hybridized carbon next to the SO$_2$ group) is present. The thiopyran dioxide can be prepared by any suitable method. In one preferred method, the procedure of Y. Gaoni (*J. Org. Chem.* 46 (1981) 4502) is used. This method makes the thiopyran dioxide in three steps from a 3-sulfolene, which is available commercially or from the reaction of a diene (e.g., butadiene or isoprene) with sulfur dioxide. The route provides access to a wide variety of substituted thiopyran dioxides because substituted dienes are readily converted to the corresponding 3-sulfolenes.

In the three-step method, a 3-sulfolene is first reacted with dichlorocarbene. The resulting adduct is partially dehalogenated with lithium aluminum hydride. Base-catalyzed ring expansion with lithium diisopropylamide gives the desired thiopyran dioxide (Scheme 1):

Scheme 1:
Preparation of 5-Methyl-2H-Thiopyran-1,1-Dioxide

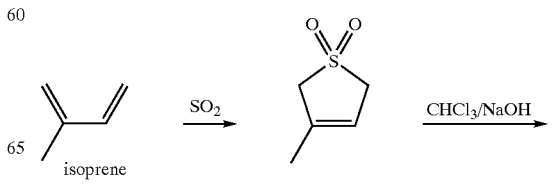

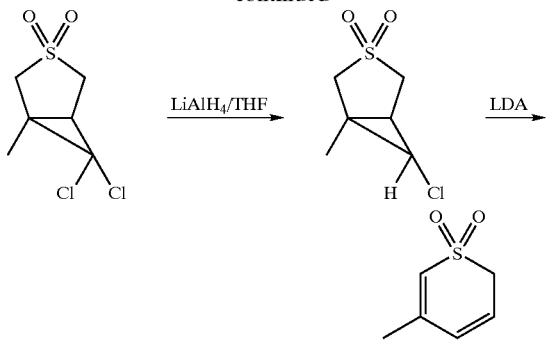

J. Org. Chem. 46 (1981) 4502

Other suitable methods for making thiopyran dioxides have been described. See, for example, E. Molenaar and J. Strating, *Rec. Trav. Chim. Pays-Bas* 86 (1967) 1047 or J. Kuthan, "Pyrans, Thiopyrans, and Selenopyrans," in *Adv. Heterocycl. Chem.* 34 (1983) 145 and J. Kuthan et al., "Developments in the Chemistry of Thiopyrans, Selenopyrans, and Teluropyrans," in *Adv. Heterocycl. Chem.* 59 (1994) 179, and references cited therein.

In addition to an anionic thiopyran dioxide ligand, the organometallic complex may include additional labile or polymerization-stable, anionic ligands. Polymerization-stable ligands include, for example, substituted and unsubstituted cyclopentadienyl, fluorenyl, and indenyl, or the like, such as those described in U.S. Pat. Nos. 4,791,180 and 4,752,597, the teachings of which are incorporated herein by reference. Suitable polymerization-stable ligands include heteroatomic ligands such as boraaryl, pyrrolyl, indolyl, quinolinoxy, pyridinoxy, and azaborolinyl as described in U.S. Pat. Nos. 5,554,775, 5,539,124, 5,637,660, and 5,902, 866, the teachings of which are incorporated herein by reference. Suitable polymerization-stable ligands include indenoindolyl anions such as those described in PCT publication WO 99/24446 and copending appl. Ser. No. 09/417, 510, filed Oct. 14, 1999, now U.S. Pat. No. 6,232,260. The organometallic complex usually includes one or more labile ligands such as halides, alkyls, alkaryls, aryls, dialkylaminos, or the like. Particularly preferred are halides, alkyls, and alkaryls (e.g., chloride, methyl, benzyl). A variety of other kinds of ligands are particularly useful with late transition metals, including, for example, N,N'-diaryl-substituted diazabutanes and other imines as described in U.S. Pat. Nos. 5,714,556 and 5,866,663, the teachings of which are incorporated herein by reference.

The catalyst system optionally includes an activator. Activators help to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like.

These and other suitable boron-containing activators are described in U.S. Pat. Nos. 5,153,157, 5,198,401, and 5,241, 025, the teachings of which are incorporated herein by reference.

The optimum amount of activator needed relative to the amount of organometallic complex depends on many factors, including the nature of the complex and activator, whether a supported catalyst is used, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of transition, lanthanide, or actinide metal, M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the organometallic complex.

The organometallic complex is prepared according to methods that are well known in the art. In general, the complexes are made by combining an anionic thiopyran dioxide ligand with a transition metal source.

The thiopyran dioxide anion is produced by deprotonating a thiopyran dioxide with a potent base. Usually, about one equivalent of base is used, but an excess may be used. Suitable bases include alkali metals (e.g., sodium or potassium), alkali metal hydrides (sodium hydride, lithium hydride), alkali metal aluminum hydrides (lithium aluminum hydride), alkali metal alkyls (n-butyllithium, methyllithium), Grignard reagents (methyl magnesium bromide, phenyl magnesium chloride), and the like. The deprotonation step is normally performed at or below room temperature by combining the thiopyran dioxide and the deprotonating agent, usually in the presence of one or more dry organic solvents, especially ethers and/or hydrocarbons.

Any convenient source of transition metal can be used. For example, the complexes can be made from transition metal halides, alkyls, alkoxides, acetates, amides, or the like. A particularly convenient source of the transition metal is the transition metal halide. For example, one can use titanium tetrachloride, zirconium tetrachloride, cyclopentadienylzirconium trichloride, tetrakis(dimethylamino) zirconium, vanadium(III) chloride-tetrahydrofuran complex (VCl$_3$(THF)$_3$), titanium(III)chloride THF complex, chromium(III)chloride-THF complex, cobalt(II) chloride, nickel(II) bromide, platinum(II) chloride, palladium(II) chloride, lanthanum(III) chloride, titanium(III)acetate, or the like. Complexes can also be prepared from salts with labile groups, such as tetrakis(acetonitrile)palladium(II) bis (tetrafluoroborate).

The transition metal complexes are easy to make. Usually, the transition metal source (halide, e.g.) is dissolved or suspended in an organic solvent and the anionic thiopyran dioxide ligand is carefully added. Refluxing is used if needed to complete the reaction. Insoluble by-products, if any, can be removed by filtration, solvents are evaporated, and the transition metal complex is isolated, washed, and dried. The resulting complex can generally be used without further purification.

The organometallic complexes of the invention are expected to be valuable catalysts, catalyst precursors, or reagents for a variety of organic reactions, including, for example, olefin metathesis, isomerization, oligomerization, and polymerization reactions.

The invention includes catalyst systems that have enhanced ability, when compared with conventional metallocenes (e.g., bis(cyclopentadienyl)zirconium dichloride or bis(indenyl)zirconium dichloride), for incorporating α-olefin or cyclic comonomers in an olefin polymerization process. These catalyst systems comprise an organometallic complex and an optional activator (as described above). The complex includes a Group 3 to 10 transition, lanthanide, or actinide metal, M, and an anionic, heterocyclic ligand that is π-bonded to M. Preferably, M is a Group 4 transition metal. The heterocyclic ligand has a heteroatom, X, that is bonded to an out-of-plane Lewis base donor atom, A. The Lewis base donor atom can coordinate with M. Suitable heteroatoms (X) include oxygen, sulfur, boron, nitrogen, and phosphorus. Suitable Lewis base donor atoms include oxygen, nitrogen, sulfur, and phosphorus.

In one preferred catalyst system, the complex has the substructure (i.e., partial structure):

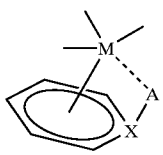

in which M is a Group 4 transition metal, A is oxygen, and X is sulfur, nitrogen, or phosphorus. More preferably, the heterocyclic ligand is an anionic thiopyran dioxide, and the complex has the substructure:

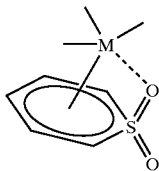

in which M is a Group 4 transition metal.

The catalyst systems are optionally used with an inorganic solid or organic polymer support. Suitable supports include silica, alumina, silica-aluminas, magnesia, titania, clays, zeolites, or the like. The supports can be pretreated thermally or chemically to improve catalyst productivity or product properties. The catalysts can be deposited on the support in any desired manner. For instance, the catalyst can be dissolved in a solvent, combined with a support, and stripped. Alternatively, an incipient-wetness technique can be used. Moreover, the support can simply be introduced into the reactor separately from the catalyst. The anionic thiopyran dioxide ligand can also be chemically tethered to the support through a suitable linking group.

The invention includes an olefin polymerization process. The process comprises polymerizing an olefin in the presence of a catalyst system of the invention according to methods that are well known in the art. Olefins useful in the process of the invention are compounds having at least one polymerizable carbon-carbon double bond. Preferred olefins have a single carbon-carbon double bond. They include ethylene and $C_3$–$C_{20}$ α-olefins such as propylene, 1-butene, 1-hexene, 1-octene, and the like. Isoolefins (e.g., isobutene or isooctene) or cycloolefins (e.g., cyclohexene) are suitable as are cyclic olefins (e.g., norbornene) and dienes (e.g., 1,3-butadiene). Some or all of the olefin can be replaced with an acetylenically unsaturated monomer (e.g., 1-octyne or 1-hexyne). Mixtures of olefins can be used. Ethylene and mixtures of ethylene with $C_3$–$C_{10}$ α-olefins are especially preferred.

Functionalized comomoners can be included provided that the comonomer also contains at least one polymerizable carbon-carbon double bond. Such functionalized monomers are used advantageously with late transition metal catalysts. For example, the olefin polymerization can be conducted in the presence of a minor proportion of allyl alcohol, acrylic acid, hydroxyethylmethacrylate, or the like. Olefin polymers prepared by the process of the invention have recurring olefin units.

Alternating copolymers of ethylene or other α-olefins, diolefins, or cyclic olefins with carbon monoxide or sulfur dioxide are also accessible using catalysts of this invention. Catalysts of the later transition metals (iron, cobalt, and nickel triads) are particularly useful for copolymerizing these monomers.

The polymerization is advantageously performed in the presence of an ionic liquid. Copending U.S. appl. Ser. No. 09/557,429, filed Apr. 25, 2000, now abandoned, the teachings of which are incorporated herein by reference, explains how to use ionic liquids with single-site catalyzed olefin polymerizations. Suitable ionic liquids are salts that exist in the liquid state at temperatures used to polymerize olefins. Preferred ionic liquids are liquids at and below room temperature, and many are liquids at temperatures as low as about –100° C. Preferably, the ionic liquids consist of a bulky organic cation and a non-coordinating, complex inorganic anion. The anion is "non-interfering" with respect to the single-site catalyst, i.e., it does not prevent or significantly inhibit the catalyst from effecting polymerization of the olefin. A wide variety of ionic liquids suitable for use in the process of the invention have been described. For example, U.S. Pat. Nos. 5,827,602, 5,731,101, 5,304,615, and 5,892,124, the teachings of which are incorporated herein by reference, disclose many suitable ionic liquids.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes. Suitable methods for polymerizing olefins using the catalysts of the invention are described, for example, in U.S. Pat. Nos. 5,902,866, 5,637,659, and 5,539,124, the teachings of which are incorporated herein by reference.

The following examples merely illustrate the invention. Those skilled in the art will recognize many variations that are within the spirit of the invention and scope of the claims.

EXAMPLE 1

Preparation of a Single-Site Catalyst

5-Methyl-2H-thiopyran-1,1-dioxide is prepared in three steps from 3-methyl-3-sulfolene using the method of Gaoni, *J. Org. Chem.*, 46 (1981) 4502. Thus, 3-methyl-3-sulfolene is first reacted with chloroform and aqueous sodium hydroxide in the presence of a quaternary ammonium salt to give the dichlorocarbene adduct. Partial dehalogenation with lithium aluminum hydride in tetrahydrofuran gives the chlorocyclopropane. Finally, base-catalyzed ring expansion with lithium diisopropylamide gives the desired thiopyran dioxide compound (see Scheme 1, above).

5-Methyl-2H-thiopyran-1,1-dioxide (288 mg, 2.0 mmol) in diethyl ether (25 mL) is deprotonated by careful addition of n-butyllithium (1.3 mL of 1.6 M solution in hexanes, 2.1 mmol) at –78° C. The resulting anion is separated from excess salts by filtration in vacuo.

The anionic thiopyran dioxide solution is added by cannula to a stirred slurry of cyclopentadienyl zirconium trichloride (526 mg, 2.0 mmol) in diethyl ether (25 mL) at −78° C. The reaction mixture is stirred and allowed to warm to room temperature. Volatiles are removed in vacuo. The residue is extracted with toluene to give a solution of the organometallic complex. This solution can be used "as is" for polymerizing olefins. The expected product has the structure:

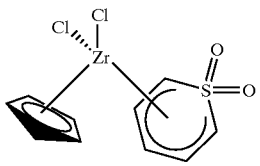

EXAMPLE 2

Polyethylene Preparation

Methyl alumoxane (5 mL of 10 wt. % MAO in toluene) is added to a portion of the product from Example 1 (200 mg). The mixture is injected into a 1.7 L stainless-steel autoclave containing dry, deoxygenated isobutane (850 mL) and triisobutylaluminum (0.2 mmol). The autoclave is heated to 80° C. and is pressurized with ethylene (150 psi). After 1 h, the autoclave is cooled, isobutane is flashed off, and polyethylene, the expected product, is isolated.

Molecular Modeling Study

In a preliminary, low-level molecular modeling study, single-site catalysts that incorporate anionic thiopyran dioxide ligands were compared with some common bridged and non-bridged metallocenes. The relative stabilities of model active sites were calculated, and the abilities of these sites to incorporate comonomers were estimated.

Active-site geometries were optimized using the semi-empirical method PM3tm (Titan software, distributed by Wavefunction, Inc. and Schrodinger, Inc.). To predict the relative stabilities of the active sites, enthalpies were calculated for the hypothetical abstraction of a methyl anion:

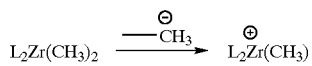

Tendency for comonomer incorporation was then estimated from the relative energies of forming pi-complexes of these cationic active sites with ethylene or propylene. The more exothermic the energy of pi-complexation of propylene vs. ethylene, the greater the predicted tendency to incorporate comonomers:

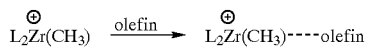

The results of the study indicate that the oxygen atoms of the thiopyran dioxide ligand are involved in two strong, specific interactions: The axial or "inside" oxygen coordinates to the transition metal and helps to stabilize the cationic active site. The equatorial or "ousted" oxygen interacts with Lewis acid centers in the activator.

Relative active site stabilities are estimated as follows:

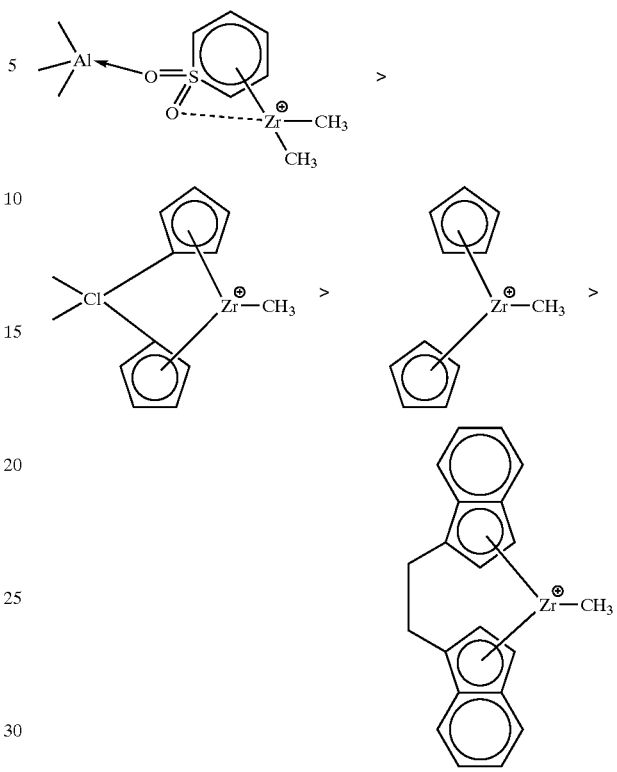

The results suggest that catalysts from organometallic complexes that incorporate anionic thiopyran dioxide ligands will be somewhat less active than conventional metallocene complexes.

Interestingly, however, the model also predict that the thiopyran dioxide-based catalysts will be excellent for incorporating comonomers. Relative ability to incorporate comonomers:

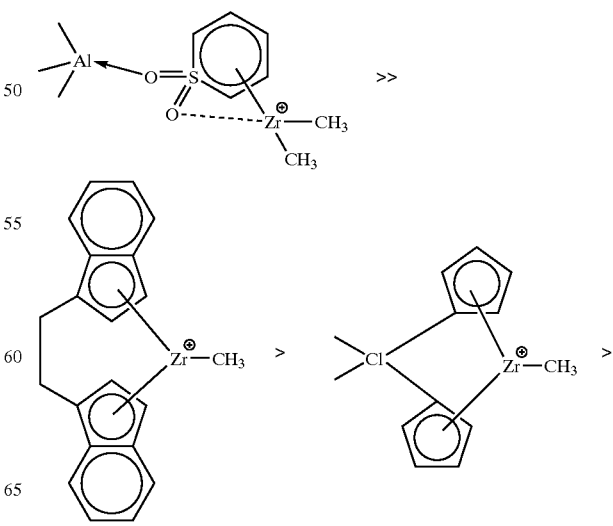

-continued

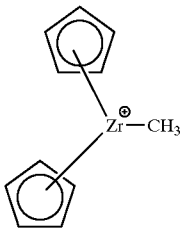

In sum, preliminary calculations indicate a more stable active site and correspondingly reduced activity for the subject single-site catalysts compared with bridged or non-bridged metallocenes, but the model also predicts an enhanced tendency of the subject catalysts to incorporate comonomers.

The preceding examples are meant only as illustrations. The following claims define the invention.

We claim:

1. A catalyst system which comprises an organometallic complex and an optional activator, wherein the complex includes a Group 3 to 10 transition, lanthanide, or actinide metal and at least one anionic thiopyran dioxide ligand.

2. The catalyst system of claim 1 comprising a Group 4 to 10 transition metal.

3. The catalyst system of claim 1 wherein the activator is an alumoxane or an ionic borate or aluminate.

4. The catalyst system of claim 1 wherein the anionic thiopyran dioxide ligand is prepared by deprotonating 2H-thiopyran-1,1-dioxide.

5. The catalyst system of claim 1 wherein the complex includes a polymerization-stable ligand selected from the group consisting of cyclopentadienyl, fluorenyl, indenyl, boraaryl, pyrrolyl, indolyl, quinolinoxy, pyridinoxy, azaborolinyl, and indenoindolyl.

6. An organometallic complex which comprises a Group Group 3 to 10 transition, lanthanide, or actinide metal and at least one anionic thiopyran dioxide ligand.

7. The complex of claim 6 comprising a Group 4 to 10 transition metal.

8. The complex of claim 6 wherein the anionic thiopyran dioxide ligand is prepared by deprotonating 2H-thiopyran-1,1-dioxide.

9. A process which comprises polymerizing an olefin in the presence of the catalyst system of claim 1.

10. The process of claim 9 wherein the olefin is ethylene or a mixture of ethylene and an α-olefin.

11. The process of claim 9 performed in the presence of an ionic liquid.

12. A catalyst system which comprises an organometallic complex and an optional activator, wherein the complex has the substructure:

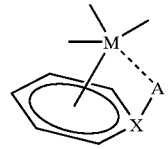

in which M is a Group 4 transition metal, A is oxygen, and X is sulfur, nitrogen, or phosphorus.

13. The catalyst system of claim 12 wherein the complex has the substructure:

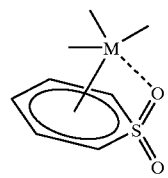

in which M is selected from the group consisting of zirconium and titanium.

14. A process which comprises polymerizing an olefin in the presence of the catalyst system of claim 12.

* * * * *